United States Patent
Hoffmann et al.

(10) Patent No.: US 11,158,065 B2
(45) Date of Patent: Oct. 26, 2021

(54) LOCALIZATION OF A MOBILE UNIT BY MEANS OF A MULTI HYPOTHESIS KALMAN FILTER METHOD

(71) Applicant: car.software Estonia AS, Tallinn (EE)

(72) Inventors: Jonas Hoffmann, Berlin (DE); Michael Holicki, Berlin (DE)

(73) Assignee: Car.Software Estonia AS, Tallinn (EE)

( * ) Notice: Subject to any disclaimer, the term of this patent is extended or adjusted under 35 U.S.C. 154(b) by 0 days.

(21) Appl. No.: 16/875,774

(22) Filed: May 15, 2020

(65) Prior Publication Data
US 2020/0364883 A1    Nov. 19, 2020

(30) Foreign Application Priority Data
May 15, 2019  (DE) .................... 10 2019 207 087.6

(51) Int. Cl.
  *G06T 7/277* (2017.01)
  *G06T 7/246* (2017.01)
  *G08G 1/13* (2006.01)
  *G06T 7/73* (2017.01)

(52) U.S. Cl.
  CPC ............. *G06T 7/248* (2017.01); *G06T 7/277* (2017.01); *G06T 7/74* (2017.01); *G08G 1/13* (2013.01); *G06T 2207/20084* (2013.01)

(58) Field of Classification Search
  CPC .......... G06T 7/277; G06T 7/248; G06T 7/74; G08G 1/13
  See application file for complete search history.

(56) References Cited

U.S. PATENT DOCUMENTS

2014/0022121 A1*  1/2014  Donovan ............... G01S 19/12
                                                  342/357.49
2017/0164315 A1*  6/2017  Smith ................... H04W 4/029

* cited by examiner

*Primary Examiner* — Sam Bhattacharya
(74) *Attorney, Agent, or Firm* — Muncy, Geissler, Olds & Lowe, P.C.

(57) ABSTRACT

A method for determining a position of a mobile unit with at least one sensor device, which is set up to capture environmental images of the mobile unit, and with a map, which comprises at least known landmarks with map position information. At least one hypothesis is determined for the at least one initially estimated position of the mobile unit and the at least one landmark detected in an environmental image, wherein the at least one hypothesis comprises at least one association of the at least one detected landmark of the at least one captured environmental image with at least one known landmark of the map. At least one new estimate of the position of the mobile unit and a weight of the at least one hypothesis are determined for the at least one hypothesis by means of at least one Kalman filter.

14 Claims, 3 Drawing Sheets

LOCALIZATION OF A MOBILE UNIT BY MEANS OF A MULTI HYPOTHESIS KALMAN FILTER METHOD

This nonprovisional application claims priority under 35 U.S.C. § 119(a) to German Patent Application No. 10 2019 207 087.6, which was filed in Germany on May 15, 2019, and which is herein incorporated by reference.

BACKGROUND OF THE INVENTION

Field of the Invention

The present invention relates to a method for determining the position of a mobile unit with at least one sensor device and with a map.

Description of the Background Art

Methods for localizing or determining the position of mobile units, such as, e.g., robots or motor vehicles, are key components of numerous applications in the fields of navigation, robotics, and autonomous driving. Satellite-based methods, which are based, for example, on data from the Global Positioning System (GPS) or another satellite-based system, sometimes have considerable measurement inaccuracies of several meters, which are inadequate for many applications in the above-mentioned fields.

A promising alternative is offered by imaging methods in which a three-dimensional reconstruction of the environment of a mobile unit can be achieved by triangulation from a plurality of environmental images captured locally by a camera. A local environment map of the mobile unit reconstructed by triangulation can be compared with a global three-dimensional map in order to be able to estimate an absolute position of the mobile unit. However, a corresponding imaging method is extremely computationally intensive, which is particularly problematic for mobile applications. In addition, the accuracy of a three-dimensional environmental reconstruction depends sensitively on local light and weather conditions.

SUMMARY OF THE INVENTION

It is therefore an object of the present invention to propose a reliable and accurate method for determining the position of a mobile unit, which can also be carried out with low computational effort.

In an exemplary embodiment, a method is provided for determining a position of a mobile unit with at least one sensor device, which is set up to capture environmental images of the mobile unit, and with a map, which comprises at least known landmarks with map position information.

The method can include: at least one position of the mobile unit is initially estimated; at least one environmental image of the mobile unit is captured by means of the at least one sensor device and at least one landmark is detected on the basis of the at least one captured environmental image; at least one hypothesis is determined for the at least one initially estimated position of the mobile unit and the at least one detected landmark, wherein the at least one hypothesis comprises at least one association of the at least one detected landmark of the at least one captured environmental image with at least one known landmark of the map; at least one new estimate of the position of the mobile unit and a weight of the at least one hypothesis are determined for the at least one hypothesis by means of at least one Kalman filter, wherein in at least one update step of the respective Kalman filter, image position information of the at least one detected landmark and map position information of the at least one known landmark associated by the at least one hypothesis with the at least one detected landmark are taken into account; and/or an optimal position of the mobile unit is determined on the basis of the at least one new estimate of the position of the mobile unit and the weight of the at least one hypothesis.

An important advantage of the method is the direct association of the at least one detected landmark with the at least one known landmark on the basis of less characteristic properties, e.g., map position information. This enables an improved estimate of the position of the mobile unit without the need for an error-prone three-dimensional reconstruction of the mobile unit's surroundings. In particular, even a single environmental image captured by the camera can be sufficient to improve the estimation of the mobile unit's position.

The mobile unit can be formed, for example, by a motor vehicle, a robotic vehicle, an aircraft, or other movement. In addition, the mobile unit can also be formed by a plurality of movement, e.g., a vehicle convoy.

The position of the mobile unit can comprise at least values for a first, second, and third map coordinate of a map coordinate system. Position and pose are used interchangeably hereafter. In addition, the position of the mobile unit can also comprise values for orientation angles that indicate an orientation of the mobile unit in a specific direction in the map coordinate system. The map coordinate system can be a global reference system in which the mobile unit is to be localized.

At least one sensor device can be formed, for example, with an optical arrangement, which comprises at least one camera for capturing an image of the surroundings, a satellite positioning system for capturing GPS data, speed sensors for capturing odometry data such as, e.g., linear velocities and/or angular velocities, acceleration sensors, a RADAR system, and/or a LIDAR system. The initial estimate of at least one position of the mobile unit can be made, for example, using GPS data and/or odometry data.

The at least one sensor device is advantageously located on/in the mobile unit. Alternatively, at least one sensor device can also be located on/in other vehicles or landmarks. In such a case, the at least one sensor device can be set up to exchange sensor measured values as information with the mobile unit or with a communication unit located on/in the mobile unit via vehicle-to-vehicle communication or vehicle-to-network communication.

The map comprises at least known landmarks with respective map position information. Map position information of the known landmarks can only be formed with values for a first and second map coordinate of a map coordinate system. In addition, map position information can also be formed with one or more values for a third coordinate of a map coordinate system, e.g., a vertical height of a known landmark. For a known landmark, the map can also comprise multiple map position data, e.g., linear or other topological profiles, and/or further structures with map position data such as, e.g., roads, footpaths, bridges, bus stops, or parking lots.

The map preferably also comprises information on the object classes of the known landmarks. An object class can assign an attribute or a function to a known landmark and/or another structure. An object class can be, for example, a traffic sign, a traffic light, a tree, a hydrant, a manhole cover, a streetlamp, or an unknown object, etc. Furthermore, the map can also comprise values for object identification numbers, object class identification numbers, or other attributes of an object class, for example, for the size, color, orientation, or vertical height, as well as typical measurement inaccuracies or variances of these values. The value for a third coordinate of a map coordinate system can initially be estimated for each object class.

The map, which can only comprise abstractive, semantic properties of known landmarks, offers the advantage of taking up little memory space in a computing unit or memory unit of the mobile unit. Furthermore, information contained in such a so-called semantic map can be updated quickly and in a resource-efficient manner, for example, by means of a data transfer session of a mobile network, in the computing unit or memory unit of the mobile unit.

At least one landmark can be detected on the basis of the at least one captured environmental image by means of a trained neural network, in particular a convolutional neural network (CNN). A bounding box and/or an object class for the at least one detected landmark are preferably determined by means of the trained neural network. An object identification number or object class identification number can also be assigned to the at least one detected landmark.

Image position information for the at least one detected landmark can then be determined using the determined bounding box, wherein image position information can be formed at least with values for a first and second coordinate of an image coordinate system. The image coordinate system can be defined such that the origin of the image coordinate system coincides with the optical center of the camera and a coordinate axis of the image coordinate system with the main axis of the camera. Another coordinate axis of the image coordinate system can form a right angle with the main axis of the camera.

The at least one landmark detected in the at least one environmental image can be compared with the map or searched for on the map. For example, at least one known landmark that can be associated with the at least one detected landmark can be determined for an estimated position of the mobile unit in a specific search area of the map. The search area can be defined by the at least one initially estimated position of the mobile unit and a search radius. In this regard, the search radius can depend on the object class of the at least one detected landmark. For example, a smaller search radius can be defined for the search for a manhole cover than for the search for a traffic light.

Preferably, only those known landmarks can be searched for the object class of which coincides with the object class of the at least one detected landmark. During the search, other attributes of object classes can also be taken into account in a plausibility check. If, for example, a traffic light is determined as the object class of the at least one detected landmark, only those traffic lights that point in the direction of the position of the mobile unit can be taken into account in the search by means of a plausibility check.

At least one hypothesis is determined with the at least one detected landmark and the at least one known landmark. In particular, at least one hypothesis can be determined for each initially estimated position of the mobile unit. A hypothesis can comprise a left complete, unambiguous mapping of the set of the at least one detected landmark to the set of the at least one known landmark. The at least one hypothesis can also be referred to as at least one particle. The terms hypothesis and particle are used interchangeably hereafter.

Preferably, multiple hypotheses are determined; particularly preferably multiple hypotheses are determined for each initially estimated position of the mobile unit. This can be particularly useful if multiple detected landmarks and/or multiple known landmarks are determined. In particular, it is possible that at least one known landmark cannot be uniquely associated with the at least one detected landmark. For example, it can be difficult to determine a unique association at a road intersection where multiple known landmarks such as, e.g., traffic lights and street signs, are located. In this case, all possible permutations of associations can be considered using multiple hypotheses. The number of all possible permutations of associations can then correspond to the number of hypotheses.

The at least one hypothesis can be stored for each estimated position of the mobile unit in an associative data field (also referred to as a key value map), wherein for the at least one hypothesis, the object identification number of the at least one detected landmark can be assigned to the object identification number of the at least one known landmark.

It can have an advantageous effect if at least one further hypothesis is determined and the at least one further hypothesis comprises an association of the at least one detected landmark of the at least one captured environmental image with at least one unknown object. Map position information of the at least one unknown object can be determined by a coordinate transformation or projection of the image coordinates of the at least one detected landmark into the map coordinate system. A value for the third coordinate of the at least one unknown object in the map coordinate system can be chosen as desired or can be estimated by comparing the bounding box of the at least one detected landmark in the image coordinate system with the bounding box of the at least one known landmark in the map coordinate system. An object identification number or object class identification number can also be assigned to the at least one unknown object. The association with at least one unknown object can be particularly useful if at least a part of the at least one environmental image is incorrectly classified and/or landmarks are detected that only exist for a certain time; e.g., detour signs, traffic jam warning signs, or accident warning signs, and/or landmarks are detected that are not present on the map.

A weight can initially be estimated or determined for the at least one hypothesis. If multiple hypotheses are determined, a weight is preferably initially estimated or determined for each hypothesis. Preferably, the weight of each hypothesis is initially the same. The sum of the weights of all determined hypotheses is particularly preferably standardized to 1.

If multiple hypotheses are determined, a new estimate of the at least one position of the mobile unit and of the weight of the respective hypothesis is determined for each hypothesis by means of a Kalman filter. The number of hypotheses thus also corresponds to the number of Kalman filter methods used or carried out in step (d) of the method. The entirety of the Kalman filter methods carried out in step (d) can also be referred to as a multi-hypothesis Kalman filter method or as a Rao-Blackwellized particle filter. A multi-hypothesis Kalman filter method is therefore a hybrid between a pure Kalman filter method and a pure particle-based method. The multi-hypothesis Kalman filter method can be used in particular to model and filter ambiguous detections and measurements. The multi-hypothesis Kalman filter method allows a very precise estimate of the position of the mobile unit based on only a few calculation steps, which can be carried out in a time-efficient manner with little computing effort. In particular, the number of hypotheses can be greatly limited by means of a multi-hypothesis Kalman filter.

A Kalman filter can be based on an equation of motion for a state vector and an observation equation that models a measurement process in which sensor measured values are captured. The Kalman filter is particularly preferably an extended Kalman filter based on a nonlinear equation of motion and/or a nonlinear observation equation. A nonlinear equation of motion or a nonlinear observation equation can preferably be linearized by the calculation of Jacobian matrices.

The state vector can comprise values for the position, linear velocities, and/or angular velocities of the mobile unit. The state vector is particularly preferably a 13-dimensional vector which comprises a four-dimensional vector of a quaternion, a three-dimensional translation vector, a three-dimensional linear velocity vector, and a three-dimensional angular velocity vector. This allows all six degrees of freedom of a position or pose of a mobile unit to be captured.

Using the equation of motion, an a-priori estimate of the position of the mobile unit can first be determined in a prediction step, at least with consideration of motion data. Motion data can include, for example, GPS data and/or odometry data or other data captured by means of the at least one sensor device.

Using the observation equation, a new estimate of the position of the mobile unit and the weight of the at least one hypothesis can then be determined in at least one update step a posteriori, with consideration of the a priori estimate of the position of the mobile unit determined by means of the equation of motion, the image position information of the at least one a detected landmark as sensor measured values, the map position information of the at least one known landmark associated by the at least one hypothesis with the at least one detected landmark, the process noise of the movement data, and/or the measurement noise of the sensor measured values. The process noise and/or the measurement noise are particularly preferably described by a normal distribution with respectively estimated or measured variances.

In particular, in the case of an extended Kalman filter, map position information of the at least one known landmark can be taken into account in a Jacobian matrix of the observation equation in at least one update step.

The state vector can also be extended dynamically before the at least one update step is carried out, and can comprise additional values for a first, second, or third map coordinate as map position information for the at least one known landmark, which is associated with the at least one detected landmark by means of the at least one hypothesis.

Particularly preferably, map position information of the at least one known landmark can only comprise values for a first and second map coordinate of a map coordinate system and a value for a third map coordinate can be initially estimated for each object class.

The state vector can then be extended dynamically by values for the first and second map coordinates as map position information for the at least one known landmark and by the initially estimated value for the third map coordinate of the object class of the at least one known landmark.

In particular, this enables a new estimate of a three-dimensional position of the mobile unit based on only two-dimensional map position information. In particular, six degrees of freedom of a mobile unit can be determined with a two-dimensional map.

Alternatively or in addition, a new estimate of at least the value of the third map coordinate of the at least one known landmark associated by the hypothesis with the at least one detected landmark can be determined and thus, for example, an estimate of the vertical height of the at least one known landmark can be improved. In this regard, the uncertainty about the height of the known landmarks can also be included in the position determination of the mobile unit. Furthermore, the heights of the known landmarks can be adjusted over time based on the captured environmental images. These principles can also be applied to an estimate of the first or second map coordinate. The thus adapted map positions and variances of the known landmarks differ from hypothesis to hypothesis.

Multiple update steps, each with different sensor measured values, can be carried out or combined in a Kalman filter. Sensor measured values can comprise, for example, image position information of the at least one detected landmark, GPS data, and/or odometry data.

GPS data and/or odometry data can preferably be captured by at least one further sensor device of the mobile unit and corresponding variances of the respective data can be estimated. The captured GPS data and/or odometry data and their estimated variances can each be taken into account as sensor measured values in a further update step of the Kalman filter.

Particularly preferably, a first update step can be carried out with consideration of GPS data as sensor measured values, a second update step with consideration of odometry data as sensor measured values, and a third update step with consideration of image position information of the at least one detected landmark as sensor measured values. Particularly preferably, multiple update steps are carried out successively.

Alternatively or in addition, at least one further hypothesis can be determined on the basis of the estimated variance of the GPS data and/or odometry data. For example, a hypothesis can be divided into two hypotheses, wherein for one of the two hypotheses the captured GPS data and/or odometry data are taken into account as sensor measured values in at least one further update step of the Kalman filter and for the other of the two hypotheses no further update step of the Kalman filter is carried out with consideration of captured GPS data and/or odometry data as sensor measured values. Such a division of a hypothesis into two hypotheses is particularly useful when the sensor measured values taken into account for one of the two hypotheses in an update step are fraught with a high degree of measurement inaccuracy or variance.

The new estimate of the position of the mobile unit can be determined as the optimal position of the mobile unit. If multiple hypotheses are determined, the new estimate of the position of the mobile unit of the hypothesis with the greatest weight can be determined as the optimal position of the mobile unit.

Alternatively, an arithmetic mean of the newly estimated positions of multiple hypotheses, a mean weighted by the weights of the hypotheses, can be determined as the optimal position of the mobile unit. Hypotheses with a very small weight can be disregarded when averaging.

If, for example, the greatest weight falls below a predetermined limit value, at least the method steps (b) to (d) can also be repeated in order to determine an improved estimate of the current position of the mobile unit. In particular, the mobile unit can be in a driving state or in a state of movement, wherein at least the method steps (b) to (d) can be repeated continuously during the entire travel time.

For this purpose, the at least one initially estimated position of the mobile unit can be replaced by the previously determined new estimate of the position of the mobile unit.

If multiple hypotheses have been determined previously, the at least one initially estimated position of the mobile unit is replaced by multiple new estimates, which in turn can generate new hypotheses with the repetition of process steps (b) to (d).

Steps (b) to (d) of the method can also be repeated multiple times in order to iteratively achieve an improvement of the estimate of the at least one position of the mobile unit. The at least one hypothesis can preferably be stored as a history during or after each execution of method steps (b) to (d). In particular, the respective history of associations of object detections in the environmental image with known landmarks of the map can be stored in the memory for the hypotheses. Redundant or inconsistent hypotheses can also be prevented thereby.

If at least one of the detected landmarks stored in the history matches a newly detected landmark during the repetition of method step (b), the stored hypothesis can be adopted as a new hypothesis for this newly detected landmark without new hypotheses having to be formed. A possible association with other known landmarks can then be considered by other hypotheses. This can effectively limit the number of hypotheses newly determined during a repetition.

The invention also provides a system which comprises a mobile unit, at least one sensor device, and a map, wherein the system is designed to carry out the method. In addition, the system can comprise at least one digital electronic evaluation unit and control unit such as, e.g., a CPU and/or GPU, and/or a computing unit, which are/is designed to carry out the described method.

The system is capable of estimating the position or pose of the mobile unit in all six degrees of freedom and demonstrates a robustness against false detections, ambiguous measurements, and changes in environmental influences and light conditions.

Furthermore, the invention provides a computer program product which has a computer program (or a command sequence), which has software for carrying out the described method and/or for controlling the at least one sensor device and/or for updating the map, when the computer program runs in a computing unit. The computer program product can preferably be loaded directly into an internal memory or a memory unit of the computing unit or is already stored therein and typically comprises parts of a program code for carrying out the described method when the computer program product runs or is executed on the computing unit. The program code or parts of the program code can be written in a script language or a compiler language, such as C, C++, Python, etc. The computer program product can be stored on a machine-readable carrier, preferably on a digital storage medium.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
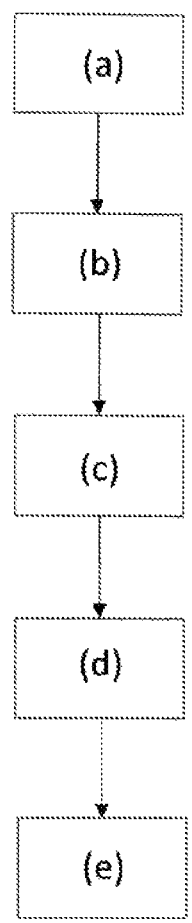
FIG. 1 shows a flowchart of a method for determining a position of a mobile unit.

FIG. 1 shows a flowchart of a method for determining a position of a motor vehicle as a mobile unit.

In step (a) of the method, a position of the motor vehicle is initially estimated using GPS data.

Figure 2A:
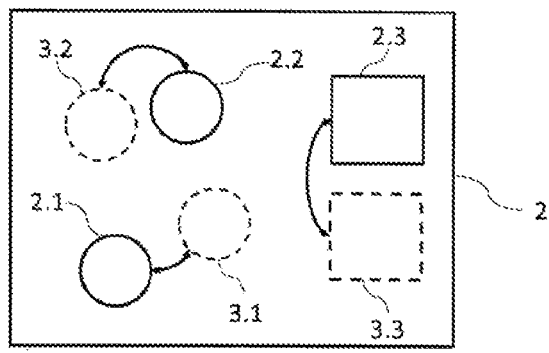
FIG. 2a shows a schematic representation of a first hypothesis with detected landmarks and associated known landmarks.
Figure 2B:
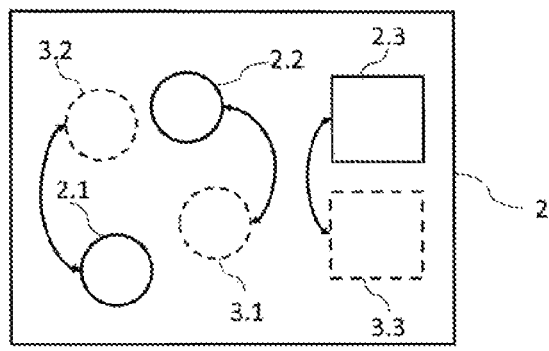
FIG. 2b shows a schematic representation of a second hypothesis with detected landmarks and associated known landmarks.

In step (b) of the method, an environmental image 2 of the motor vehicle is captured by means of a camera 1.1, 1.2 as a sensor device (see, for example, FIGS. 2a, 2b). Three landmarks 2.1, 2.2, 2.3 with image position information are detected in environmental image 2 by means of a trained neural network. A first 2.1 and a second 2.2 detected landmark are classified as traffic lights by means of the trained neural network. A third 2.3 detected landmark is classified as a street sign.

In step (c) of the method, two hypotheses, a first and a second hypothesis, are determined for the initially estimated position of the motor vehicle and the three detected landmarks 2.1, 2.2, 2.3. Each hypothesis associates the three detected landmarks 2.1, 2.2, 2.3 of environmental image 2 in each case with a known landmark 3.1, 3.2, 3.3 of a two-dimensional map, which comprises map position information and information about the object class of known landmarks 3.1, 3.2, 3.3. The map position information only comprises values for a first and a second map coordinate of a map coordinate system.

In step (d) of the method, an extended Kalman filter method is carried out parallel in time for each of the two hypotheses. Each extended Kalman filter method comprises a prediction step and three update steps which are performed successively for each hypothesis. The third update step takes into account the image position information of the three detected landmarks 2.1, 2.2, 2.3 and map position information of the known landmarks 3.1, 3.2, 3.3 in each case associated with the three detected landmarks 2.1, 2.2, 2.3 by the respective hypothesis. A new estimate of the position of the motor vehicle with a respective weight is then determined for each hypothesis. The two extended Kalman filters of the two hypotheses form a multi-hypothesis Kalman filter.

In step (e) of the method, the hypothesis with the greater weight is determined. For example, if the first hypothesis has a greater weight than the second hypothesis, the new estimate of the position of the motor vehicle of the first hypothesis is determined as the optimal position of the motor vehicle. The new estimate of the position of the motor vehicle of the second hypothesis is rejected.

The method is carried out with a system that comprises the motor vehicle as a mobile unit, camera 1.1, 1.2 as a sensor device for capturing environmental image 2, a satellite positioning system as a sensor device for capturing GPS data, and an arrangement of odometry sensors as a sensor device for capturing linear velocities and angular velocities, and the map, wherein the system is designed to carry out the method. The map comprises known landmarks 3.1, 3.2, 3.3 with map position information and information about the object classes of the known landmarks 3.1, 3.2, 3.3. The sensor devices are located in or on the motor vehicle. Moreover, the system comprises a computer with a CPU, GPU, and electronic memory. An initial estimated value for the vertical height of a respective object class is stored in the electronic memory for each object class.

FIG. 2a shows a schematic representation of the first hypothesis.

Environmental image 2 is shown with three detected landmarks 2.1, 2.2, 2.3 and the three known landmarks 3.1, 3.2, 3.3 projected into environmental image 2 based on the initially estimated position of the motor vehicle. The arrows shown indicate the association of the first hypothesis.

The first hypothesis associates known landmark 3.1 with detected landmark 2.1 and known landmark 3.2 with detected landmark 2.2. Known landmark 3.3 is associated with detected landmark 2.3.

FIG. 2b shows a schematic representation of the second hypothesis.

Environmental image 2 is shown with three detected landmarks 2.1, 2.2, 2.3 and the three known landmarks 3.1, 3.2, 3.3 projected into environmental image 3.1 based on the initially estimated position of the motor vehicle. The arrows shown indicate the association of the second hypothesis. The second hypothesis associates known landmark 3.2 with detected landmark 2.1 and known landmark 3.1 with detected landmark 2.2. Known landmark 3.3 is associated with detected landmark 2.3.

Figure 3:
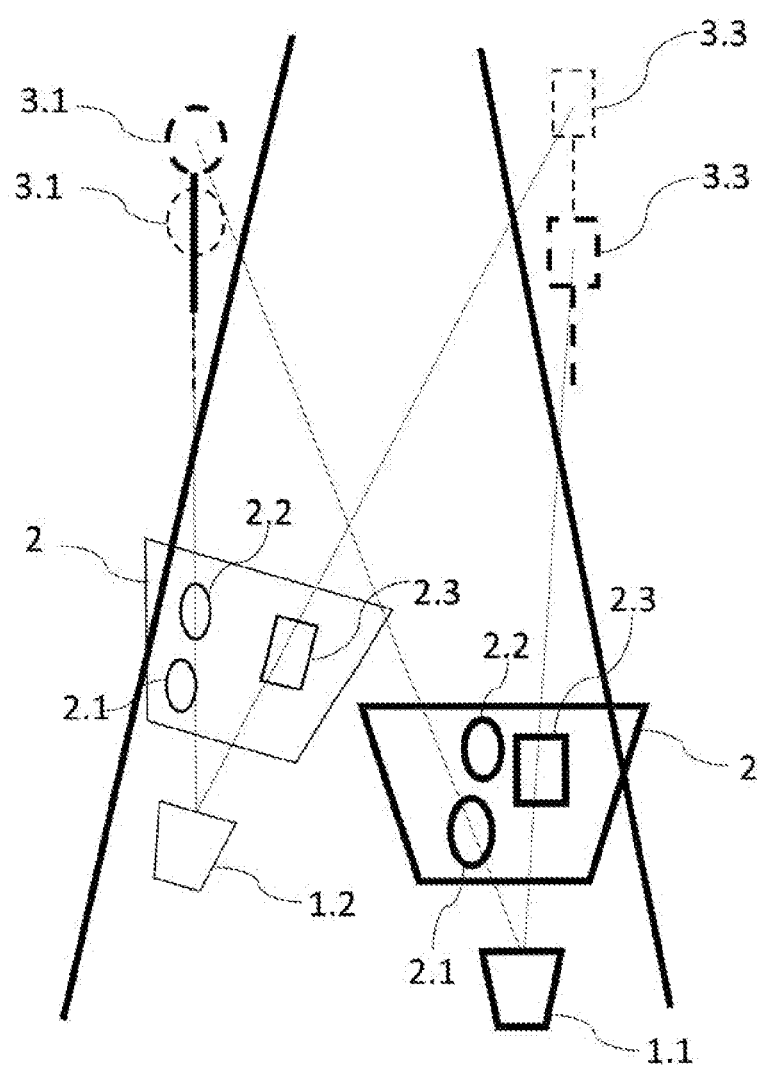
FIG. 3 shows a schematic representation of an estimate of the vertical heights of known landmarks.

FIG. 3 shows by way of example known landmarks 3.1, 3.3, each with different estimated vertical heights, which were determined by a dynamic extension of the state vector and after performing the three update steps from the correction of the dynamically extended state vector. In FIG. 3, the position of camera 1.1 corresponds to the optimal position of the motor vehicle according to the first hypothesis. The position of camera 1.2 corresponds to the new estimate of the position of the motor vehicle from the second hypothesis, which is rejected. Accordingly, the estimate of the vertical heights according to the first hypothesis is also an optimal estimate of the vertical height of known landmarks 3.1, 3.3.

Known landmark 3.2 is not shown in FIG. 3 for a better representation of the associations.

The extended Kalman filter used here will be described in detail below:

The extended Kalman filter comprises a 13-dimensional state vector $$x=[q t \omega v]^T$$

with $$q=[q_w,q_x,q_y,q_z]^T$$

$$t=[t_x,t_y,t_z]^T$$

$$\omega=[\omega_x,\omega_y,\omega_z]^T$$

$$v=[v_x,v_y,v_z]^T,$$

where the quaternion q and the three-dimensional translation vector t give a position or pose, the three-dimensional angular velocity vector $\omega$ the pitch angular velocity, roll angular velocity, and yaw angular velocity, and the three-dimensional linear velocity vector v three linear velocities of the motor vehicle in the map coordinate system. A first, second, and third coordinate of the map coordinate system and values for the pitch, roll, and yaw angle as the orientation angle of the motor vehicle can be calculated with the quaternion q and the three-dimensional translation vector t.

The state vector is initially estimated using GPS data and odometry data. In the following text, the subscript k refers to a point in time $t_k$ of the method and $\Delta k = t_k - t_{k-1}$ to the time interval between two points in time. The subscript k can also be used synonymously with the point in time $t_k$. In some formulas/variables, the subscript k is omitted for a simplified representation. An implicit time dependence or dependence on the subscript k is then derived from the context in which the particular formulas/variables are specified. Each of the two hypotheses is initially assigned the weight $\alpha_{10}=\alpha_{20}=0.5$, where in general $\alpha_{ik}$ describes the weight of the i-th hypothesis at time $t_k$.

The extended Kalman filter is based on an equation of motion $$x_k = f(x_{k-1}, u_{k-1}, \omega_{k-1}),$$

with the prediction function $f$, where the equation of motion can also be written simplified as $$x_k = f(x_{k-1}, u_k) + \omega_k.$$

The variable $u_k$ here denotes additional control parameters (if available) and $w_k$ the process noise, which is described by a (multivariate) normal distribution with the mean $\langle w_k \rangle = 0$ and covariance $Q_k$. No additional control parameters $u_k$ are considered below. The variable $u_k$ can therefore also be omitted in the prediction function $f$.

The extended Kalman filter comprises a prediction step in which an a priori estimate of the state vector $$\hat{x}_{k|k-1} = f(\hat{x}_{k-1}, w, v, \Delta k) = \begin{bmatrix} f_q \\ f_t \\ f_\omega \\ f_v \end{bmatrix} \begin{bmatrix} M(\hat{q})Q(A(\tilde{\omega})) \\ t + R(\tilde{q})(\tilde{v}) \\ \omega + w \\ v + \upsilon \end{bmatrix}$$

is determined, where $$M(q) = \begin{bmatrix} q_w & -q_x & -q_y & -q_t \\ q_x & w_w & -q_x & q_y \\ q_y & q_z & q_w & -q_x \\ q_x & -q_y & q_z & q_w \end{bmatrix}$$

denotes a quaternion multiplication matrix which is evaluated for a normalized quaternion $$\tilde{q} = \frac{q}{\|q\|} = \frac{q}{\sqrt{q_w^2 + q_x^2 + q_y^2 + q_z^2}}.$$

Furthermore, $$Q(e) = \begin{bmatrix} \cos\frac{\theta}{2} \\ e_x \sin\frac{\theta}{2} \\ e_y \sin\frac{\theta}{2} \\ e_z \sin\frac{\theta}{2} \end{bmatrix}$$

denotes a function with which the output of the rotation function $$A(\omega) = e = \begin{bmatrix} \theta \\ e_x \\ e_y \\ e_z \end{bmatrix} = \begin{bmatrix} \theta \\ \frac{\omega_x}{\theta} \\ \frac{\omega_y}{\theta} \\ \frac{\omega_z}{\theta} \end{bmatrix}$$

can be transformed into a quaternion, the local rotation being calculated from $$\bar{\omega} = (\omega+w)\Delta k$$

and the angle $$\theta = \|\omega\| = \sqrt{\omega_x^2 + \omega_y^2 + \omega_z^2}$$

from the norm of the angular velocity vector $\omega$.

The normalized quaternion can be transformed with the function $$R(q) = \begin{bmatrix} 1-2(q_y^2+q_z^2) & 2(q_xq_y-q_zq_w) & 2(q_zq_x+q_yq_w) \\ 2(q_xq_y+q_zq_w) & 1-2(q_z^2+q_x^2) & 2(q_yq_x-q_zq_w) \\ 2(q_zq_x-q_yq_w) & 2(q_yq_z+q_zq_w) & 1-2(q_x^2+q_y^2) \end{bmatrix}$$

into a rotation matrix. A correction of the translation vector then results in particular from $$(R(\hat{q})(\tilde{v}))$$

with the local velocity $$\tilde{v} = (v+v)\Delta k.$$

In the equations given above, the error vectors w, v are unknown and are set to zero, i.e., $$w=v=0.$$

In order to simplify the calculation, the nonlinear equation of motion is linearized. This is achieved with the Jacobian matrix of the prediction function with respect to the state vector $$F_k = \frac{\partial f}{\partial x}\bigg|_{\hat{x}_{k-1|k-1}, u_k}$$

or in matrix notation $$F = \begin{bmatrix} \frac{\partial f_q}{\partial q} & 0 & \frac{\partial f_q}{\partial w} & 0 \\ \frac{\partial f_q}{\partial q} & \frac{\partial f_q}{\partial t} & 0 & \frac{\partial f_z}{\partial v} \\ 0 & 0 & \frac{\partial f_q}{\partial w} & 0 \\ 0 & 0 & 0 & \frac{\partial f_v}{\partial v} \end{bmatrix}$$

and with the Jacobian matrix of the prediction function with respect to the process noise of the angular velocities $$W = \begin{bmatrix} \frac{\partial f_q}{\partial w} \\ 0 \\ \frac{\partial f_w}{\partial w} \\ 0 \end{bmatrix}$$

and with the Jacobian matrix of the prediction function with respect to the process noise of the linear velocities $$V = \begin{bmatrix} 0 \\ \frac{\partial f_t}{\partial v} \\ 0 \\ \frac{\partial f_v}{\partial v} \end{bmatrix}.$$

The aforementioned partial derivatives can be calculated analytically. The corresponding determination equations or algebraic expressions are not explicitly worked out here for a compact representation of the method.

The extended Kalman filter is based further on an observation equation $$z_k = h(x_k, v_k),$$

with the update function h, wherein the observation equation can also be written simplified as $$z_k = h(x_k) + v_k.$$

In this case, the variable $z_k$ denotes the sensor measured values captured with a sensor device at the time $t_k$ or between times $t_k$, $t_{k-1}$ and $v_k$ denotes the measurement noise of the sensor device or the sensor measured values. Analogous to the process noise, the measurement noise is described by a (multivariate) normal distribution with a mean $\langle v_k \rangle = 0$ and covariance $R_k$.

Three update steps are carried out successively with the extended Kalman filter and in each case a new correction of the state vector $$\hat{x}_{k|k} = \hat{x}_{k|k-1} K_k \tilde{y}_k$$

is determined, where $$\tilde{y}_k = z_k - h(\hat{x}_{k|k-1})$$

indicates the deviation between the captured sensor measured values $z_k$ and the expected sensor measured values $h(\hat{x}_{k|k-1})$. To this end, the Kalman gain $$K_k = P_{k|k-1} H_k^T S_k^{-1}$$

is calculated from the covariance matrix $$P_{k|k-1} = F_{k-1} P_{k-1|k-1} F_{k-1}^T + L_{k-1} Q_{k-1} L_{k-1}^T$$

and the innovation matrix $$S_k = H_k P_{k|k-1} H_k^T + M_k R_k M_k^T,$$

where $$H_k = \frac{\partial h}{\partial x}\bigg|_{\hat{x}_{k|k-1}}$$

denotes the Jacobian matrix of the update function with respect to the state, $$M_k = \frac{\partial h}{\partial \upsilon}\bigg|_{\hat{x}_{k|k-1}}$$

denotes the Jacobian matrix of the update function with respect to the measurement noise, and $$L_{k-1} = \frac{\partial f}{\partial \omega}\bigg|_{\hat{x}_{k-1|k-1}\cdot u_{k-1}}$$

denotes the Jacobian matrix of the prediction function with respect to the process noise.

The above expressions are valid for a formulation of the Kalman filter in which the process noise and the measurement noise depend on the state itself (referred to as non-additive noise formulation).

The expressions are simplified if the process noise and the measurement noise are assumed to be constant. The covariance matrix is then given by $P_{k|k-1} = F_k P_{k-1|k-1} F_k^T + Q_k.$ and the innovation matrix by $S_k = H_k P_{k|k-1} H_k^T + R_k.$ Both a constant and a state-dependent measurement noise or process noise can be modeled with the method.

In order to be able to carry out the formalism shown above, the covariance matrix is initially estimated.

The first update step is carried out with consideration of GPS data as sensor measured values with a value for a first map coordinate $GPS_x$ and a second map coordinate $GPS_y$. The vector of the captured sensor measured values is two-dimensional:

$$z_k = \begin{bmatrix} GPS_x \\ GPS_y \end{bmatrix}.$$

The expected sensor measured values based on the a priori estimate result directly from the corresponding components of the translation vector $$h(\hat{x}_{k|k-1}) = \begin{bmatrix} t_x \\ t_y \end{bmatrix}.$$

The Jacobian matrix of the update function with respect to the state is given by $$H = \begin{bmatrix} 0 & 0 & 0 & 0 & 1 & 0 & 0 & 0 & 0 & 0 & 0 & 0 \\ 0 & 0 & 0 & 0 & 0 & 1 & 0 & 0 & 0 & 0 & 0 & 0 \end{bmatrix}.$$

The measurement noise is determined by the covariance matrix $$R_k = \begin{bmatrix} \sigma_{CPSx}^2 & 0 \\ 0 & \sigma_{CPSy}^2 \end{bmatrix}$$

with $\sigma_{GPS_x} = \sigma_{GPS_y} = 5.0$ m.

A first a posteriori estimate of the state vector is determined based on these data.

The second update step is carried out with consideration of odometry data as sensor measured values.

To this end, a yaw angular velocity $\omega_{odom}$ is captured as a sensor measured value $z_k = [\omega_{odom}].$ The expected sensor measured values result from $h(\hat{x}_{k|k-1}) = [\omega_x].$ The Jacobian matrix of the update function with respect to the state is given by $H = [0\ 0\ 0\ 0\ 0\ 0\ 0\ 1\ 0\ 0\ 0].$ The measurement noise is described by the covariance $R_k = [\sigma_{\omega odom}^2]$ with $\sigma_{\omega odom}^2 = 0.0175$ rad $s^{-1} \approx 1° s^{-1}.$ In addition and analogously, successive further corrections of the state vector can be calculated in the second update step as substeps of the second update step, for example, with consideration of the pitch angular velocity, roll angular velocity, and the linear velocities as captured sensor measured values.

The third update step is carried out with consideration of image position information of the m=3 detected landmarks as sensor measured values.

The vector of the captured sensor measured values is given by $$z_k = \begin{bmatrix} p_1 \\ \vdots \\ p_m \end{bmatrix},$$

where $p_i = [u_i, v_i]^T$ denotes the geometric center of the bounding box of the i-th detected landmark in environmental image 2 with a value $u_i$ for the first image coordinate or pixel coordinate and a value $v_i$ for the second image coordinate or pixel coordinate. Thereby, the image position information of all landmarks 2.1, 2.2, 2.3 detected in environmental image 2 are combined in one vector and viewed as a single measurement.

In addition, the state vector is extended dynamically $\hat{x}_{k|k-1} = [qt\ \omega v P_{M_i} \ldots P_{Mm}]^T$ and also comprises the map positions $P_{Mi} = [x_i y_i z_i]^T,$ which are associated with the three detected landmarks 2.1, 2.2, 2.3 by the respective hypothesis. In particular, the map position $P_{Mi}$ comprises values for a first map coordinate $x_i$ and a second map coordinate $y_i$ as map position information of the i-th known landmark 3.1, 3.2, 3.3, which is associated by the respective hypothesis with the i-th detected landmark 2.1, 2.2, 2.3. The value $z_i$ for the third map coordinate is initially estimated and depends on the object class of the respectively associated known landmark 3.1, 3.2, 3.3. The third map coordinate indicates the vertical height of the known landmark 3.1, 3.2, 3.3. The vertical height can be corrected or re-estimated in the third update step by the dynamic extension of the state vector.

To calculate the expected sensor measured values $h(\hat{x}_{k|k-1})$ or the Jacobian matrix of the update function with respect to the dynamically extended state, a coordinate transformation from the map coordinate system to the image coordinate system must be carried out. For this purpose, the map position information of the known landmarks 3.1, 3.2, 3.3 are taken into account in the observation equation or in the update function. The expected sensor measured values result from $$h(\hat{x}_{k|k-1}, P_{M1} \ldots P_{Mm}) = \begin{bmatrix} h(\hat{x}_{k|k-1}, P_{M1}) \\ \vdots \\ h(\hat{x}_{k|k-1}, P_{Mm}) \end{bmatrix}$$

with $$h(\tilde{x}_{k|k-1}, P_{Mi}) = p(R_C^H(R(\hat{q})^{-1}(P_{Mi}-t)) + t_C^R),$$

where $R_C^R$ denotes a rotation matrix and $t_C^R$ translation vector with which a coordinate transformation from a vehicle coordinate system into the map coordinate system can be achieved. The vehicle coordinate system can be selected such that a coordinate axis of the vehicle coordinate system coincides with the rear axle of the motor vehicle as a mobile unit. A projection into the image coordinate system can then be carried out with the function $$p(P_C) = \begin{bmatrix} u \\ v \end{bmatrix} = \frac{1}{c}\begin{bmatrix} a \\ b \end{bmatrix},$$

where $$\begin{bmatrix} a \\ b \\ c \end{bmatrix} = CP_C$$

and $$C = \begin{bmatrix} f_x & s & u_0 \\ 0 & f_y & v_0 \\ 0 & 0 & 1 \end{bmatrix}$$

indicate the camera matrix with the focal lengths of the camera 1.1, 1.2

$$f_{x,y} = f * s_{x,y}.$$

Here $s_{x,y}$ denotes scale factors of the focal length $f$ and $[u_0, v_0]^T$ the geometric center of environmental image 2 in pixel coordinates.

The Jacobian matrix of the third update step is then given by $$H = \begin{bmatrix} \frac{\partial h(\hat{x}_{k|k-1}, P_{M1})}{\partial q} & \frac{\partial h(\hat{x}_{k|k-1}, P_{M1})}{\partial t} & 0 & 0 & \frac{\partial h(\hat{x}_{k|k-1}, P_{M1})}{\partial P_{M1}} & 0 & 0 \\ \vdots & \vdots & 0 & 0 & 0 & \ddots & 0 \\ \frac{\partial h(\hat{x}_{k|k-1}, P_{Mm})}{\partial q} & \frac{\partial h(\hat{x}_{k|k-1}, P_{Mm})}{\partial t} & 0 & 0 & 0 & 0 & \frac{\partial h(\hat{x}_{k|k-1}, P_{Mm})}{\partial P_{Mm}} \end{bmatrix},$$

wherein the partial derivatives can be calculated analytically with the expressions given above for the update function (not shown here).

The covariance matrix is given by $$P_{k|k-1} = \begin{bmatrix} \Sigma_{[q\ t\ w\ v]} & 0 & \ldots & 0 \\ 0 & \Sigma_{P_{M1}} & \ldots & 0 \\ \vdots & \vdots & \ddots & 0 \\ 0 & 0 & 0 & \Sigma_{P_{Mm}} \end{bmatrix},$$

where $$\Sigma_{[q\ t\ w\ v]}$$

denotes the 13×13 covariance matrix of the non-extended state and $$\sum_P = \begin{bmatrix} \sigma_{P_x}^2 & 0 & 0 \\ 0 & \sigma_{P_y}^2 & 0 \\ 0 & 0 & \sigma_{P_z}^2 \end{bmatrix}^T$$

the 3×3 covariance matrix of a map position. The corresponding variances are estimated. In particular, the variances of the map position depend on the object class. Typically, the estimated variances of the first and second map coordinates are very small, because they are precisely marked on the map, whereas the variance of the third map coordinate, therefore, the vertical height, can be large, because only an initial estimate of the vertical height based on the object class is known.

After each update step or each correction of the state vector, a weight of the respective hypothesis can also be calculated. The weight of the i-th hypothesis at the time $t_k$ results from $$\alpha_{ik} = \alpha_{ik-1} \left( \frac{1}{\sqrt{(2\pi)^m |S_{ik}|}} e^{-\frac{1}{2}(\tilde{y}_{ik})^t S_{ik}^{-1}(\tilde{y}_{ik})} \right),$$

where $S_{ik}$ denotes the innovation matrix and $\tilde{y}_{ik}$ the deviation between the captured and the expected sensor measured values, which are calculated for the i-th hypothesis at the time $t_k$ in the respective update step carried out at this time.

After the third update step has been carried out, a new estimate of the position of the motor vehicle is determined from the state vector corrected up to that point, and a new estimate of the weight of the respective hypothesis is determined from the weight corrected up to that point.

If the new estimate of the position of the motor vehicle and/or of the weight of the respective hypothesis does not meet specified quality criteria, method steps (b) to (d) can be repeated in order to iteratively achieve an improvement of the estimate of the at least one position of the mobile unit. For example, a predetermined quality criterion can include that at least one new estimate of the weight must exceed a critical predetermined value.

Before method steps (b) to (d) are carried out again, the two hypotheses are stored as a history. The number of hypotheses newly determined during the repetition of method steps (b) to (d) can be limited by means of the stored history.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a position of a mobile unit with at least one sensor device, which is set up to capture environmental images of the mobile unit, and with a map, which comprises at least known landmarks with map position information, the method comprising:
   estimating, initially, at least one position of the mobile unit;
   capturing at least one environmental image of the mobile unit via the at least one sensor device and detecting at least one landmark based on the at least one captured environmental image;
   determining at least one hypothesis for the at least one initially estimated position of the mobile unit and the at least one detected landmark, and the at least one hypothesis comprises at least one association of the at least one detected landmark of the at least one captured environmental image with at least one known landmark of the map;
   determining at least one new estimate of the position of the mobile unit and a weight of the at least one hypothesis for the at least one hypothesis via at least one Kalman filter, wherein in at least one update step of the respective Kalman filter, image position information of the at least one detected landmark and map position information of the at least one known landmark associated by the at least one hypothesis with the at least one detected landmark are taken into account; and
   determining an optimal position of the mobile unit based on the new estimate of the position of the mobile unit and the determined weight of the at least one hypothesis.

2. The method according to claim 1, wherein a position of the mobile unit comprises at least values for a first, second, and third map coordinate of a map coordinate system and/or comprises values for orientation angles that indicate an orientation of the mobile unit in a specific direction in the map coordinate system.

3. The method according to claim 1, wherein map position information of the known landmarks is only formed with values for a first and second map coordinate of a map coordinate system.

4. The method according to claim 1, wherein the map also comprises information on the object classes of the known landmarks.

5. The method according to claim 1, wherein the at least one landmark is detected based on the at least one captured environmental image via a neural network.

6. The method according to claim 1, wherein multiple hypotheses are determined and at least one new estimate of the position of the mobile unit and a weight of the respective hypothesis are determined for the respective hypothesis using a Kalman filter as a component of a multi-hypothesis Kalman filter.

7. The method according to claim 6, wherein the state vector of the Kalman filter comprises values for the position, linear velocities, and/or angular velocities of the mobile unit and/or map position information of the at least one known landmark.

8. The method according to claim 6, wherein the Kalman filter is an extended Kalman filter and/or in at least one update step of the Kalman filter, map position information of the at least one known landmark is taken into account in an observation equation.

9. The method according to claim 1, wherein multiple update steps, each with different sensor measured values, are carried out in a Kalman filter.

10. The method according to claim 1, wherein GPS data and/or odometry data are captured by at least one further sensor device of the mobile unit and are taken into account as sensor measured values in a further update step of a Kalman filter.

11. The method according to claim 1, wherein at least the steps of estimating and capturing are repeated in order to iteratively achieve an improvement of the estimate of a current position of the mobile unit.

12. The method according to claim 1, wherein the at least one hypothesis is stored as a history and the number of hypotheses newly determined during a repetition of the method steps is limited by the stored history.

13. A system comprising a mobile unit, at least one sensor device, a map, and at least one electronic evaluation unit and control unit, wherein the system is designed to carry out the method according to claim 1.

14. A computer program product which has a computer program which has software for carrying out the method according to claim 1 when the computer program runs in a computing unit.

* * * * *